John Hall's. Race Course Toy Bank.
118011
Fig. 1.
PATENTED AUG 15 1871
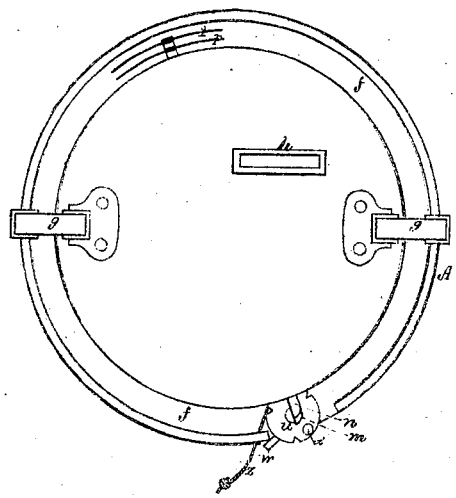
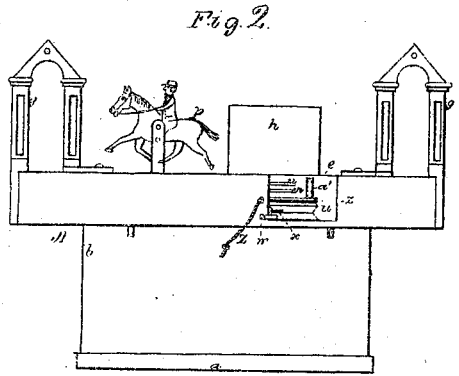
Fig. 2.
Fig. 5.
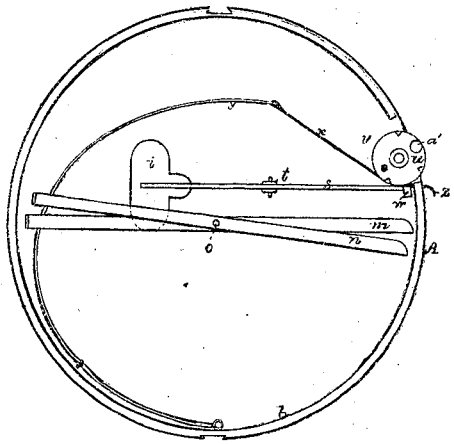
Fig. 4.
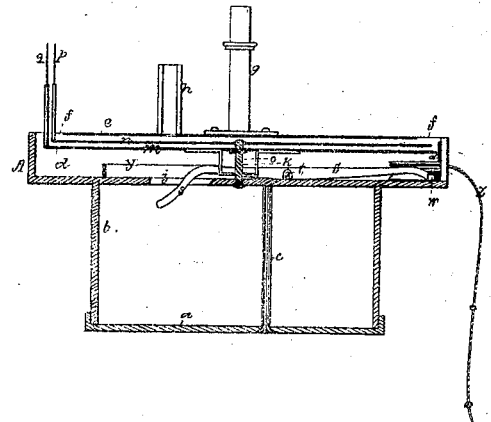
Fig. 3.
Witnesses
S. N. Piper.
L. N. McLeod
J. Hall.
by his attorney
R. H. Lacy
AM. PHOTO-LITHOGRAPHIC CO. N.Y. (OSBORNE'S PROCESS.)

118,011

UNITED STATES PATENT OFFICE.

JOHN HALL, OF WATERTOWN, MASSACHUSETTS.

IMPROVEMENT IN RACE-COURSE TOY-BANKS.

Specification forming part of Letters Patent No. 118,011, dated August 15, 1871.

*To all whom it may concern:*

Be it known that I, JOHN HALL, of Watertown, of the county of Middlesex and State of Massachusetts, have invented a new and useful Toy-Bank, which I term the "Race-Course Toy-Bank;" and I do hereby declare the same to be fully described in the following specification and represented in the accompanying drawing, of which—

Figure 1 denotes a top view, Fig. 2 a front elevation, and Fig. 3 a transverse section of it. Fig. 4 is a top view of it with its ground or cap-plate removed, the same exhibiting the mechanism for effecting the race.

In such drawing, A denotes a cylindrical box having its bottom $a$ and top $b$ held to the body $a$ by one or more screws, $c$, or other proper devices, admitting of the removal of either the top or the bottom, or both, from such body. The top is provided with a cylindrical chamber, $d$, within the upper part of which is a disk or ground-plate, $e$, having a diameter less than that of the chamber in order that there may be an annular space, $f$, extending around the periphery of the said disk. The disk is supported in position by two arches, $g$ $g$, which span opposite parts of the space $f$, are fixed to the disk, and dovetailed into the top $b$. A small tube, $h$, erected on the disk opens through the latter directly over a hole or slot, $i$, made through the top $b$, as shown. A tubular pivot, $k$, disposed on the top $b$ at its center is provided near its foot with a shoulder, $l$, to give support to a bar or lever, $m$, arranged with respect to and to receive the said pivot in manner as shown. Over the said lever $m$ is another such lever, $n$, from whose center a pivot, $o$, extends into the pivot $k$ and rests on a step formed within such. Each lever turns upward through the race-way $f$, and has affixed to the vertical part the figures of a horse and rider, as seen at $p$ or $q$, or some other figures that may be deemed proper for use. The levers with their attachments are to be balanced so as to enable the levers to swing freely around on their pivots, one attachment or horse and rider being arranged at a less distance from the center of motion than the other, so as to be able to freely pass the other or be passed by it while both may be in revolution or in race.

The machinery for operating the two levers or putting them simultaneously in revolution may thus be described: A trigger-lever, $s$, pivoted to the top $b$, as shown at $t$, extends over or into the hole or slot $i$ in such top, and underneath the table over such slot. The outer arm of the said lever (curved as shown in Fig. 5, which is a side view of the lever) is tangential to a horizontal wheel, $u$, arranged as shown, so as to revolve on a stationary pivot, $v$. A short tooth, $w$, extends from the wheel at or near its lower side, and there is affixed to the periphery of the wheel a cord, $x$, which is extended and fastened to the free end of a curved spring, $y$. This spring at or near its other extremity is fastened to the inner circumference of the chamber in the cover. Furthermore, there is another cord, $z$, fixed to the circumference of the wheel, and wound around such and extended through a hole in the rim of the top $b$. A small stud, $a'$, is projected upward from the top of the wheel. By taking hold of and pulling the cord $z$ the wheel may be revolved so as to wind the cord $x$ upon it against the draft of the spring. The tooth $w$ will pass underneath and force up the lever-arm next to it, and when the cord is relieved from draft the tooth will rest against the outer end of the trigger-lever. This having been done, the horses are to be brought around to the starting-point so as to bring the two levers directly over the wheel. All this having been done, if a piece of money be next dropped into the conductor or tube $h$ it will fall upon the trigger-lever and depress its lower arm, and as a consequence will elevate the outer arm above the tooth, and thereby enable the spring to fly back and suddenly revolve the wheel, whose stud, by being smartly forced against the two levers carrying the horses or racers, will put them simultaneously in rapid revolution and thereby effect the race. The box serves as a bank or depository for the money that may be dropped into it from time to time. As it will be evident that one of the race-levers $m$ $n$ may be dispensed with when the race is to be run with one image, and the position at which it may come to a halt is to determine the race, or the race is to be "against time," I sometimes make the apparatus with but one of such racing horses, but in other respects as described, in which case, if desirable, there may be divisional or other marks on the ground-plate or box to indicate the points of rest or halt of the object.

I claim—

1. The combination and arrangement of either or both the race-levers *m n*, the trigger-lever *s*, the spring *y*, and the wheel *u* provided with the tooth *w* and stud *a'*, all being applied to a box, A, or base, so as to operate substantially as set forth.

2. The combination of the disk or ground-plate *e* and its arches or supporters *g g*, as described, with the box or base A and one or more race-levers *m n*, applied thereto and having operative mechanism, substantially as specified.

3. The race-course toy-bank, composed of instrumentalities as described, constructed and arranged in manner and so as to operate substantially as and for the purpose as set forth.

JOHN HALL.

Witnesses:
   R. H. EDDY,
   J. R. SNOW.